Sept. 27, 1955 W. H. SCHUMACHER 2,718,838
LAWN EDGER AND TRIMMER
Filed March 1, 1954 2 Sheets-Sheet 1

William H. Schumacher
INVENTOR.

BY Loyal J. Miller
ATTORNEY

United States Patent Office 2,718,838
Patented Sept. 27, 1955

2,718,838

LAWN EDGER AND TRIMMER

William H. Schumacher, Oklahoma City, Okla.

Application March 1, 1954, Serial No. 413,220

5 Claims. (Cl. 97—227)

The present invention relates to lawn trimming tools and more particularly to a power driven tool for edging a lawn adjacent a curbing or the like.

A number of power driven devices have been made for edging a lawn, employing various types of cutters. Most of these lawn edgers have at least one, and in most cases two primary objections to their operation. One objection is that those of them, made for trimming the grass only, have only a short handle making it necessary for the operator to stoop over or crawl along the lawn edge while trimming the grass. Another objection is that those having a long handle, and are designed for cutting out a portion of the sod adjacent the curbing, have a fixed cutting depth and must be manually lifted over any visible obstruction to prevent damage to the cutting blade.

The present invention is designed to overcome these and other objections by providing a device of the class described, having a long handle, and which will automatically disengage the blade from contact with the lawn.

Accordingly the primary object of the present invention is to provide a device of the class described that is light in weight and which may be used by the operator while working in an upright position.

Another object is to provide a lawn edging device that will not only trim the grass, but will cut out a beveled edge of the sod adjacent the side of a curb or the like.

Yet another object is to provide a device of this class in which the depth of cut into the lawn sod may be regulated by hand pressure on a part of the device.

Still another object is to provide a lawn edging device that is power driven and requires only the guiding hand of the operator to edge a lawn.

The present invention accomplishes these and other objects by providing a vertically disposed handle body carried by a wheel and having a tubate body slidably disposed around the handle and supporting a motor carrying a revolving blade.

Other objects will be apparent from the following description when taken in conjunction with the accompanying two sheets of drawings, wherein.

Like characters of reference designate like parts in those figures of the drawings in which they occur.

In the drawings.

Figure 1:
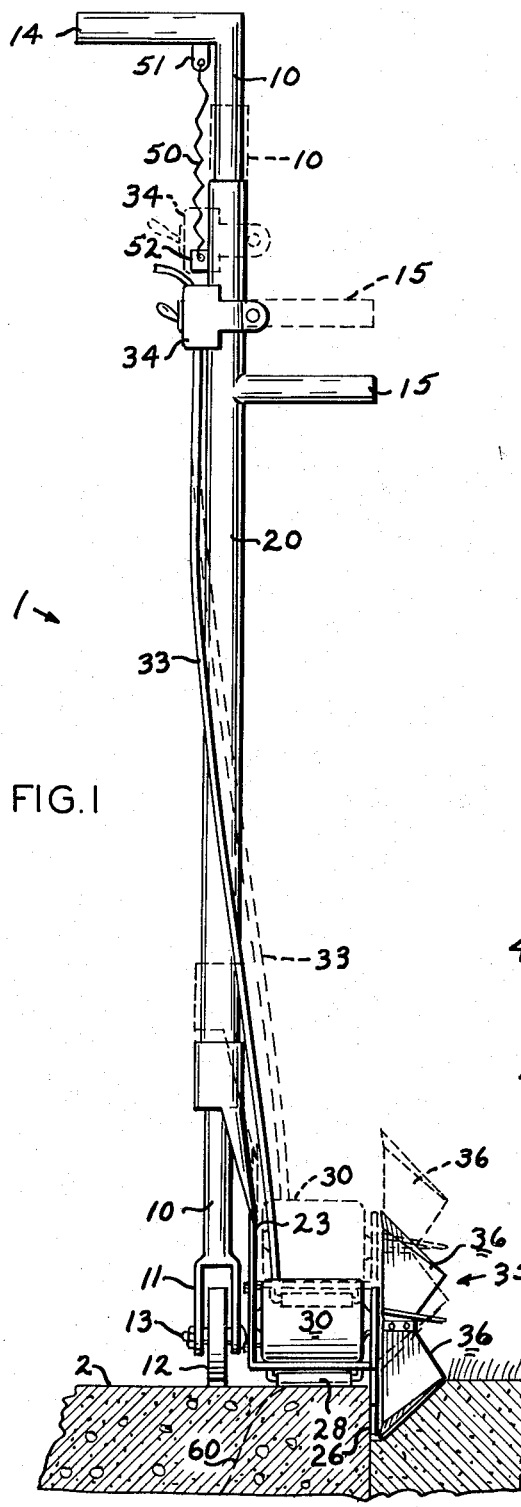
Figure 1 is a rear elevational view of the device, having one part removed to more clearly show the working parts thereunder.

Reference numeral 1 indicates the device, as a whole, in operative position on a walk 2 adjacent a lawn 3.

The device 1 comprises an upright elongated inner tubate body 10 of an appropriate length, having a through-perforated bifurcated lower end 11 journaling a wheel 12, on a horizontal axis or pivot pin 13. The upper end of the body 10 is abruptly turned outwardly, to the left as seen in Fig. 1, perpendicular to its longitudinal axis, forming a comparatively short handle 14. An outer tubate frame member 20, having an inside diameter slightly larger than the periphery of the body 10, and a length substantially shorter than the length of the body 10, is slidably disposed around the body 10, between the handle 14 and the end 11. A handle 15, similar to the handle 14, is rigidly attached, as by welding, to the upper end portion of the frame member 20, perpendicular to the longitudinal axis of the frame. A downwardly and outwardly extending angular substantially U-shaped sheet metal bracket 21 has one leg 23 rigidly attached, preferably by welding, to the lower end of the frame member 20. The bracket 21 has a substantially flat horizontal bottom 22. The lower portion of the leg 23 and the end 24 are perpendicular to the bottom 22 and parallel with the body 10. The end 24 extends upwardly a comparatively short distance and has a central vertical slot 25 to receive a motor shaft, as explained hereinbelow. Upon the forward or leading edge of the end 24 is formed a depending guide blade 26. A similar guide blade 27 is located at the rearward edge of the end 24. The forward and lower edges of the guides 26 and 27 are sharpened for the purposes more fully explained hereinbelow. A comparatively small elongated roller 28 is rotatably carried transversely by the under surface of the bottom 22 in position for rotation in co-operation with the wheel 12.

Figure 4:
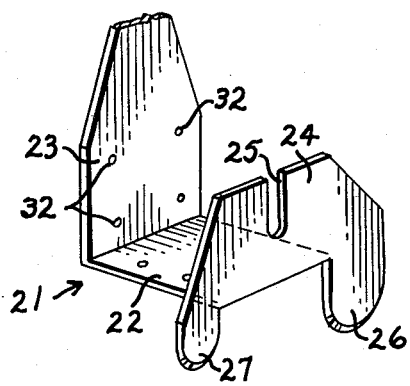
Figure 4 is a perspective view of a part of the device, showing the motor support bracket.

An electric motor 30 is horizontally disposed within the bracket 21 upon the bottom 22, with its drive shaft extending laterally outwardly through the slot 25 of the bracket end 24. The motor 30 is rigidly attached to the end 23 by bolts and nuts 31, through perforations 32 in the bracket end 23 (Fig. 4). The motor 30 is operatively connected to a source of power, not shown, by an electric cord 33, through a suitable switch 34 mounted upon the frame 20 adjacent the handle 15.

It is thought to be evident that an internal combustion engine might well be substituted for the electric motor 30, for using the device 1 where electric power connections are not available as, for example, in parks.

Figure 5:
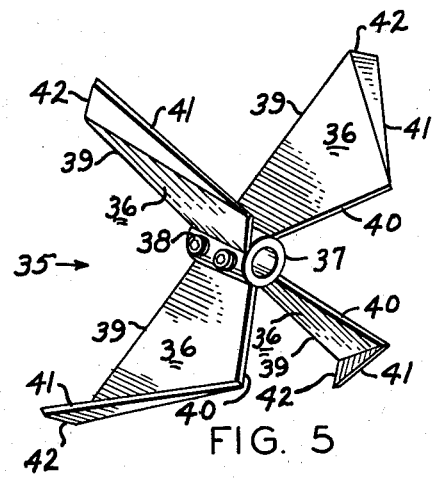
Figure 5 is a perspective view of another part of the device, showing the cutter.

A cutter 35 (Fig. 5), having a plurality of substantially triangularly shaped blades 36, rigidly attached longitudinally to a central hollow shaft member 37, is mounted upon the motor shaft and is held in place by set screws 38. Each blade 36 has one edge 39 perpendicular to the shaft 37 and parallel with the end 24 of the bracket 21 and extending outwardly from the shaft 37 a selected distance, forming a cutter having a diameter sufficient to make a cut in the lawn 3 of a desired depth. The opposite edge 40 of the blade 36 extends angularly laterally or outwardly from the shaft 37, a selected distance to form a blade 36 having a desired width, and is then abruptly angled inwardly to terminate with the edge 39, thus forming a forward or cutting edge 41 on substantially a 45° angle with relation to the edge 39. The edge 41 is beveled or sharpened for better cutting. A portion of the blade 36, along the side 39 adjacent the edge 41, is angularly bent forward as at 42 (Figs. 2 and 5) to give a slicing effect to the blade edge 41 as it engages the soil of the lawn 3.

An additional purpose of creating a slicing action of the cutting edge 41 of the blades is to insure the cutting or scooping out the soil and grass as opposed to a "beating or slapping" action of a blade which flatly contacts the grass and soil as it is rotated into contact with the same.

Figure 2:
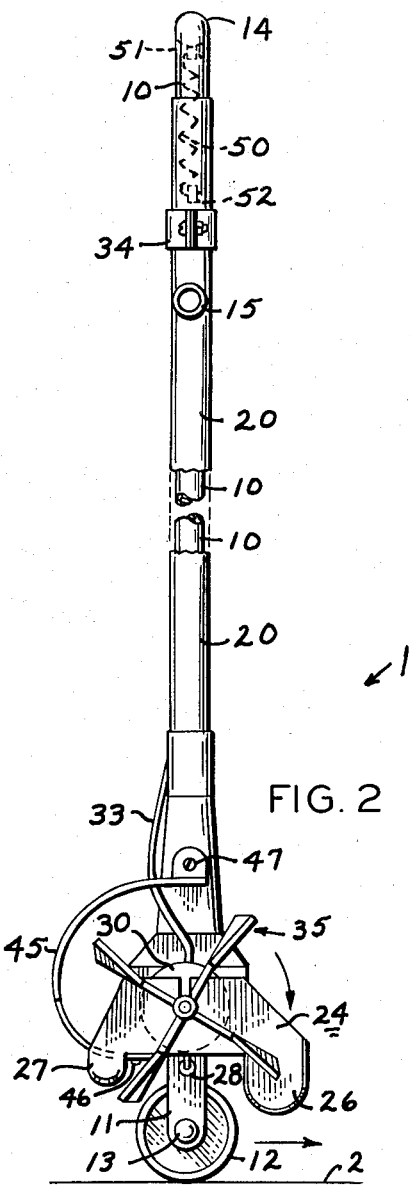
Figure 2 is a fragmentary right elevational view of the device.
Figure 3:
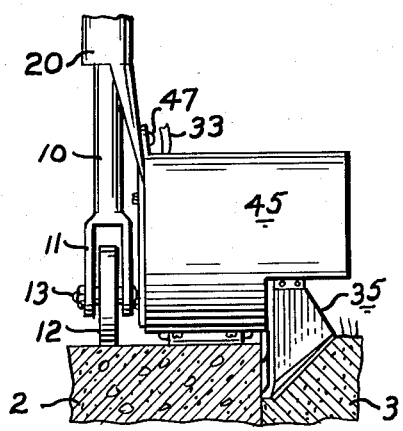
Figure 3 is a fragmentary rear elevational view of the lower part of the device.

As seen in Figs. 2 and 3, an appropriate guard 45 is longitudinally disposed above the motor 30 and cutter 35, being attached at its lower end to the bottom 22 by screws 46, and at its upper end to the leg 23 by a screw 47. The guard 45 extends outwardly or laterally a sufficient distance to cover the cutter blades 36 and protect the operator from soil being thrown upwardly by the cutter.

The frame member 20 and its associated assemblage of parts is supported in its upper position (Fig. 2) upon the body 10, by a helically wound tension-spring 50, having its upper end attached to a depending lug 51 on the lower side of the handle 14, and its opposite or lower end attached to a lug 52 adjacent the upper end of the frame 20.

Figure 6:
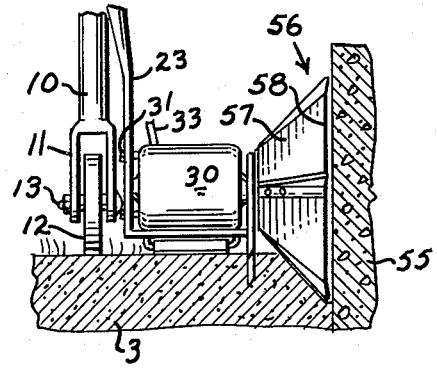
Figure 6 is a view similar to Fig 3, but showing an alternate embodiment of the device.

Illustrated in Figure 6 is an alternate embodiment of the device being used to edge a lawn 3 adjacent a vertical wall or foundation 55. This embodiment is identical with the device 1, except for the cutter 56 which is substantially a reversal of the cutter 35. The cutter 56 has a plurality of blades 57, having a side 58 parallel with the bracket end 24, disposed outwardly a spaced distance substantially equal to the transverse width of the blades 57. The cutting edges of the blades are formed and sharpened similarly to the edges 41 and 42, as described hereinabove. This embodiment of the device may be used to trim around the edges of a lawn adjacent a flower bed not bordered by concrete or the like.

Operation

In operation the operator connects the motor to a source of power, not shown, grasps the handle 14 in his left hand and the handle 15 in his right hand, places the wheel 12 upon the surface of a walk adjacent the lawn to be edged and turns on the electric switch. He then manually pushes the frame member 20, and the revolving cutter 35, downwardly toward the lawn, positioning the guides 26 and 27 adjacent the edge of the walk. When the frame 20 is forced downwardly until the roller 28 contacts the upper surface of the walk, the cutter 35 will cut its maximum depth, as shown in solid lines in Fig. 1. The cutter blades 36 revolve in the direction as shown by the arrow in Fig. 2, as the operator manually rolls the device 1 forwardly, as shown by the lower arrow in Fig. 2. Constant pressure must be maintained upon the handle 15 by the operator to keep the cutter in engagement with the lawn 3. If an obstruction such as a rock or stick is in the path of the cutter, the operator merely releases some of the downward pressure on the handle 15 and the cutter will automatically clear the obstruction, as shown in dotted lines Fig. 1, as the device passes over it. The guides 26 and 27 shave off the grass and soil clinging to the side of the walk, and protect the cutter blades 36 from coming in contact with the concrete. The device may well be used upon a curbing, as illustrated by the dotted line 60, which represents the street side of a conventional curbing. In use adjacent a curbing 60, the wheel 12 does not contact the curb. The weight of the device is carried by the roller 28 and, when used in this manner, the spring 50 does not act to raise the frame 20.

The operation of the alternate embodiment is identical with the above description for the device 1, except that the blades' edges 58 must be manually guided by the handles 14 and 15 away from the wall 55.

Obviously the invention is susceptible to some change or alteration without defeating its practicability, and I therefore do not wish to be confined to the preferred embodiment shown in the drawings and described herein, further than I am limited by the scope of the appended claims.

I claim:

1. A lawn edger including: a vertically disposed elongated body having a supporting wheel journaled on a horizontal axis between its bifurcated lower end; a tubate frame member slidably disposed upon said body, said frame member being substantially shorter than said body for adjustable vertically positioning with relation to the same; an outwardly and downwardly extending angular extension formed on the lower end, at one side, of said frame, terminating in a substantially U-shaped bracket having a substantially horizontal bottom; a transversely disposed supporting roller rotatably carried by the under side of said bottom; a rigid depending guide plate carried by the outermost side of said bracket for engaging the edge of a walk adjacent a lawn being edged; a motor carried by said bracket having a drive shaft extending horizontally beyond the outermost side of said bracket; a rotative angular edged cutter blade mounted upon said shaft; and a helically wound tension-spring having its ends attached adjacent the upper ends of said elongated body and said frame member, respectively, for retrievably raising the cutter from contact with the lawn.

2. In a lawn edger and trimmer the combination with a motor having an operatively connected rotative cutter, said motor mounted on a bracket, of: a vertically disposed elongated tubate frame member rigidly connected at its lower end to one side of said bracket; an elongated body slidably disposed within and projecting above and below said tubate frame member, having a through perforated bifurcated lower end; a wheel journaled on a horizontal axis between said lower bifurcated end for supporting said body upon the surface of a walk; a helically wound tension-spring connected operatively at its upper and lower ends to the upper ends of said elongated body and said frame member, respectively, for slidably raising said frame member on said body; a rigidly attached handle adjacent the upper end of said elongated body and said frame member for guiding said wheel, and operatively contacting said cutter with the lawn being trimmed.

3. Structure as specified in claim 2, and a roller operatively carried by said bracket for rotatively supporting said bracket and motor upon the surface of a walk; and a rigid depending guide plate carried by the bracket for engaging the edge of a walk adjacent a lawn being edged.

4. A lawn edger, including: a vertically disposed elongated body having a supporting wheel journalled on a horizontal axis between its bifurcated lower end; a tubate frame member slidably disposed upon said body, said frame member being substantially shorter than said body for adjustably vertically positioning with relation to the same; an outwardly and downwardly extending angular extension formed on the lower end, at one side, of said frame, terminating in a substantially horizontal bottom; a transversely disposed supporting roller rotatably carried by the under side of said bottom; a rigid depending guide plate carried by the outermost side of said bracket for engaging the edge of a walk adjacent a lawn being edged; a motor carried by said bracket having a drive shaft extending horizontally beyond the outermost side of said bracket; a rotative cutter mounted upon said shaft, said cutter comprising a tubate member circumferentially engaging said shaft, a plurality of blades each having a cutting edge, each said blade rigidly connected to said member and projecting radially therefrom, each said blade having one edge disposed perpendicularly with relation to said member, the cutting faces of said blades converging outwardly from said motor, a portion of each said blade bent longitudinally of said cutting edge angularly with relation to the flat surface of the blade, whereby the cutting edge co-acts with the surface of the blade to scoop out the soil; and a helically wound tension spring having its ends attached adjacent the upper ends of said elongated body and said frame member, respectively, for retrievably raising the cutter from contact with the lawn.

5. A lawn edger, including: a vertically disposed elongated body having a supporting wheel journalled on a horizontal axis between its bifurcated lower end; a tubate frame member slidably disposed upon said body, said frame member being substantially shorter than said body for adjustably vertically positioning with relation to the same; an outwardly and downwardly extending angular extension formed on the lower end, at one side, of said frame, terminating in a substantially horizontal bottom; a transversely disposed supporting roller rotatably carried by the under side of said bottom; a rigid depending guide plate carried by the outermost side of said bracket for engaging the edge of a walk adjacent a lawn being edged; a motor carried by said bracket having a drive shaft extending horizontally beyond the outermost side of said bracket; a rotative cutter mounted upon said shaft, said cutter comprising a tubate member circumferentially engaging said shaft, a plurality of substantially triangular-shaped blades rigidly connected to said member and projecting radially therefrom, the base of each said triangular blade disposed perpendicularly with relation to said member and parallel with relation to said guide plate, the apex of each said triangular blade disposed outwardly from said motor, forming a beveled outwardly converging cutting edge, a portion of each said blade bent longitudinally of said cutting edge angularly with relation to the flat surface of the blade, whereby the cutting edge co-acts with the surface of the blade to scoop out the soil; and a helically wound tension spring having its ends attached adjacent the upper ends of said elongated body and said frame member, respectively, for retrievably raising the cutter from contact with the lawn.

References Cited in the file of this patent

UNITED STATES PATENTS

| | | |
|---|---|---|
| 2,088,534 | Pittman | July 27, 1937 |
| 2,139,353 | Bruder | Dec. 6, 1938 |
| 2,410,196 | Benthall | Oct. 29, 1946 |
| 2,445,842 | Trevino | July 27, 1948 |
| 2,486,458 | Bender | Nov. 1, 1949 |
| 2,673,396 | Beres | Mar. 30, 1954 |